United States Patent Office 3,274,015
Patented Sept. 20, 1966

3,274,015
DRYING OIL BASED COATING COMPOSITIONS AND METHOD OF IMPROVING SAME
Nathaniel Willis, Chicago, Ill., assignor, by mesne assignments, to Dow Corning Corporation, Midland, Mich., a corporation of Michigan
No Drawing. Filed May 9, 1963, Ser. No. 279,292
6 Claims. (Cl. 106—252)

This invention relates to a method of improving certain properties in oil based paints for exterior applications and to the paint compositions having these improved properties. Specifically, the improvements consist of reduced volumetric swelling in the paint film and reduced solubility of the film under weathering exposure. These improvements, in turn, produce significant improvements in blister and peel resistance and total film durability.

The use of drying oils in exterior house paints has been declining in recent years. The basic problem in this regard has been the relatively high water sensitivity of such paint films. Water sensitivity is concomitant with swelling of the paint film, blistering and other loss of adhesion which in most cases amounts to a complete failure of the film. With or without complete failure of the film, mildew may also develop within and beneath the film where there is water sensitivity in the dried paint composition. Additionally, water sensitivity is also reflected in a different form in gradual dissolution of the paint film in the course of weathering.

Accordingly, it is an object of this invention to provide a method of minimizing water sensitivity of paints adapted for exterior use.

A further object of the invention is to provide a method of minimizing water sensitivity of exterior paints as that sensitivity may be reflected in swelling, blistering, loss of adhesion, mildewing and general paint film dissolution and erosion.

Another object of this invention is to provide paint compositions possessing reduced water sensitivity and attendant blister, peel and mildew resistance along with improved overall durability.

Also an object of the invention is to provide both a method for and composition capable of extending and perpetuating the use of drying oils in paints having exterior applications.

An additional object is to provide a paint composition possessing good potential as a self-primer so that separate selection of a suitable undercoat is not required.

These and related objects are accomplished by this invention wherein the silazane reaction product of ammonia and a mixture of dimethyldichlorosilane and vinyltrichlorosilane, either of these silanes being present in said mixture in amounts of from about 20 to about 80 molar percent, is added to and incorporated into a drying oil based paint in amounts up to and somewhat in excess of 10 percent of the drying oil content of the paint.

Processes for ammonolysis of halosilanes are set forth in various patents such as U.S. 2,462,635 to Haber and U.S. 2,579,417 and 2,579,418, both to Cheronis. Ammonolysis is conducted at temperatures near 0° C. in the absence of water and in the presence of an inert solvent such as methylene chloride, the ammonia becoming an amino substituent replacing one or more of the halogen substituents on the silicon atom of the halosilane.

As the most readily available and therefore the least expensive, the halosilanes preferred for the purpose of this invention are the chlorosilanes and therefore the following development of the invention will be in terms of chlorosilanes only as these represent the broader area of suitable halosilanes.

Because the functionality or reactivity of the silazane reaction product is related to the functionality established by the chlorosilanes, a mixture of dimethyldichlorosilane and vinyltrichlorosilane is employed in making the reaction product contemplated by this invention. A silazane reaction product with a functionality below about 2.2 (about 80 percent difunctional silazane based on dimethyldichlorosilane) will be too non-reactive. Above a functionality of 2.8 (about 80 percent trifunctional silazane based on vinyltrichlorosilane) the reaction product will be so reactive as to react with itself and be either solid or so viscous as to be relatively insoluble, unmanageable and unreactive.

Ammonolysis of a mixture of from about 20 to 80 molar percent of dimethyldichlorosilane and the balance of vinyltrichlorosilane is carried out at reduced temperatures in the same manner as ammonolysis of a single halosilane using either liquid or gaseous ammonia according to methods set forth in the aforementioned patents. The following examples will illustrate procedures and resulting reaction products having preferred application in the practice of this invention.

PREPARATION I

Into a dry reactor 230 pounds of methylene chloride are introduced as solvent for 12.15 pounds (0.045 pound mole) of vinyltrichlorosilane and 5.84 pounds (0.075 pound mole) of dimethyldichlorosilane, this being a mixture of the two halosilanes in a molar ratio of 5 to 3, respectively. The reactor is closed, swept with nitrogen and the contents cooled to $-5°$ C. before introducing gaseous ammonia below the liquid surface. In the course of 100 minutes 9.25 pounds of ammonia are added with the temperature being maintained below 1° C. and falling as the reaction is concluded to $-11°$ C. The mixture is heated to 25° C., filtered to remove by-product ammonium chloride, and the solvent removed by stripping at a temperature of 40° C. and 29.5 in. vaccum.

The product with no solvent present in a viscous, hazy, light yellow liquid; 32.67% C, 7.31% H, 23.0% N, 36.6% Si and 0.77% Cl. Cryoscopic molecular weight is 732, $n_D^{25}$ 1.5218 and $d_{25}=1.124$.

PREPARATION II

Into a 12-liter reactor 227.5 g. (1.76 moles) of redistilled dimethyldichlorosilane and 569.4 g. (3.53 moles) of redistilled vinyltrichlorosilane were introduced with 5 liters of methylene chloride as solvent. With the reaction maintained at a median temperature of 0° C., gaseous ammonia was introduced below the surface of the liquid. Temperatures rose to a high of 17° C. and fell to as low as $-16°$ C. as the reaction was concluded. Removal by filtration of the ammonium chloride and solvent stripping at 25–30° C. left a heavy opaque liquid which was on analysis 31.6% C, 7.3% H, 22.45% N, 38.34% Si and 0.79% Cl with $n_D^{25}$ 1.5238.

In the foregoing formulations and in preparation of various other molar proportions of dimethyldichlorosilane and vinyltrichlorosilane results are reasonably reproducible although not precisely so, because of the different possible ways that the silazanes as formed can join in forming the final silazane reaction product.

Formula I

| | Lb./gal. |
|---|---|
| Zinc oxide | 2.43 |
| Rutile titanium dioxide | 1.71 |
| Magnesium silicate | 3.78 |
| Raw linseed oil | 4.73 |
| Mineral spirits and Pb/Mn drier | .86 |

The paint thus formulated was prepared in a ball mill and then divided into equal portions. Various amounts up to 10.2 percent of the silazane reaction product of Preparation I above were added by stirring into each portion of the paint and 4.5 mil wet films were drawn from each portion immediately on gummed paper using a doctor blade. After 10 days air-dry under ambient conditions the films were removed from the paper and weighed in air and water to determine volume. One set of films was then exposed in a weatherometer for 15 days. Following this, both the air-dry and the air-dry, weathered films were soaked in distilled water for 3 days. The volume and weight changes subsequently measured are found in the examples in the following table:

TABLE I

| Examples | Silazane Quantity, Percent of Oil | Film Thickness, Mils, 10-Day Air Dry | Percent Volumetric Swelling After 3 Days in Water | | Solubility (Weight Loss) g./100 cc. | |
|---|---|---|---|---|---|---|
| | | | 10-Day Air Dry | 10-Day Air Dry, 15-Day Weathered | 10-Day Air Dry | 10-Day Air Dry, 15-Day Weathered |
| Control | 0 | 3.5 | 76.6 | 51.5 | 3.8 | 1.3 |
| 1 | 2.6 | 3.4 | 60.3 | 48.5 | 2.7 | 1.0 |
| 2 | 5.0 | 3.5 | 44.1 | 33.8 | 2.4 | 0.8 |
| 3 | 7.6 | 3.7 | 33.0 | 26.2 | 1.7 | 0.6 |
| 4 | 10.2 | 3.8 | 25.9 | 18.2 | 1.1 | 0.3 |

From Table I it can be seen that the decrease in both volumetric swelling and solubility are proportional to the amount of silazane reaction product added to the paint formulation. At levels of add-on as low as 2.6 percent by weight of the oil in the paint a noticeable improvement occurs. At percentages higher than 10.2, the silazane reaction product continues to produce reductions in these values but incremental changes are also diminished so as to make the further improvement unnecessarily expensive in general.

These four examples exhibited additional benefits including a reduction in drying time from a 6 to 8 hour range down to 4 hours. Smoothness and gloss of the film for the four examples was also better than those for the control or unmodified film.

Nine other white exterior house paints of both linseed oil and oil-modified alkyd types were modified by addition of the silazane reaction product of Preparation I as 10 percent by weight of either the oil or alkyd content which varied from 28 to 35 percent of the paint formulation. The nine formulations were faster drying than the corresponding controls and, as applied to wood sidings heavily chalked by four years of weathering, these silazane modified paint films showed considerably less dirt pick-up during and at the end of one year's exposure.

Blister box testing, an accelerated method of observing film durability as moisture vapor is passed through it, was conducted on films applied to western red cedar using the following both as a control and as a silazane modified paint:

*Formula II*

Lb./gal.

Mono-basic leaded zinc oxide, 18% mono-basic lead sulfate _____ 3.56
Anatase titanium dioxide, semi-chalking _____ 1.29
Anatase titanium dioxide, free-chalking _____ .45
Magnesium silicate _____ 3.46
Raw linseed oil _____ 2.68
Heat-bodied linseed oil _____ 1.27
Lead naphthenate, 24% _____ .06
Manganese naphthenate, 6% _____ .02
Mineral spirits _____ 1.39

The silazane reaction product of Preparation I, in this case, was reacted with the linseed oil as 5 percent by weight of the total linseed oil and the thus modified linseed oil used in making up a formulation equivalent to Formula II.

Test pieces of both the control and silazane modified formulations were developed as 5 mil drawdowns to permit a visual comparison. Examination after a 72-hour drying period indicated a superior gloss in the dry films containing the 5 percent silazane reaction product add-on.

Blister tests were made on self-primed specimens with the first coat of each of Formula II as the control and of Formula II modified with the silazane as a 5 percent by weight of oil additive being applied at the rate of 450 sq. ft. per gallon dried for 2 days. The second coat of each was applied at 550 sq. ft. per gallon and dried for 10 days. The thus modified self-primed paint film had only a few isolated patches of blisters after exposure in the blister box whereas the self-primed control was essentially covered with blisters after the same exposure, the blisters in both being small after 2 days' exposure and increasing to ¼ inch diameter at the end of 7 days in the box.

As has been seen, the silazane reaction products can be added either to the total paint formulation or to the drying oil. In so modifying the drying oils such as linseed, tung, perilla, soybean, dehydrated castor and the other conventional but presently lesser used drying oils, the exact mechanism is not precisely definable but there apparently is reaction with the drying oils in any case as evidenced by the liberation of ammonia. Where the silazane reaction products are added to the oils it can be done by cold blending such as stirring or by cold blending followed by heating to 60° C. with or without vacuum stripping of the ammonia.

In some paint formulations the addition of these silazane reaction products has the effect of lowering the viscosity. In these cases sufficient puffing agent can be added, without changing the paint formulation in any other way, to produce the desired brushing consistency in the finished product. Likewise, in some exterior white paint formulations the inclusion of these silazane reaction products produces a yellowish tinge in the paint as applied and during the drying period but in such cases there is no significant difference in whiteness as compared to a control after one week's outdoor exposure. Because the silazane reaction products employed in this invention have proven to be satisfactory additives in white paint formulations, it is within the scope of the invention to employ them in other pigmented paints as well. However, the silazane reaction products of this invention do exhibit varying degrees of reactivity with various tinting pigments. In such cases, any unfavorable effect of such reactivity can generally be minimized by adding the silazane reaction products to the drying oils alone rather than to the complete paint including a tinting pigment.

By the practice of this invention it is possible to produce paints especially suitable for exterior applications by reason of reduced water sensitivity. More specific benefits in the matter of reduced water sensitivity are reduced moisture pick-up by the paint film, reduced swelling and blistering of the film, and reduced weight loss of paint film from weathering. The foregoing advantages are, furthermore, available without any significant loss of film hardness and with some attendant improvement in gloss.

Having thus described the invention what is claimed is:

1. A method of reducing water sensitivity of a drying oil based paint which comprises adding, as a percentage of the drying oil content of said paint, up to about 10 percent by weight of the reaction product of ammonia and a mixture comprising from about 20 to about 80 molar percent of dimethyldichlorosilane and the balance of said mixture being vinyltrichlorosilane.

2. The method of claim 1 in which said reaction product is that of ammonia and a mixture of from about 30 to about 40 molar percent of dimethyldichlorosilane and the balance of said mixture being vinyltrichlorosilane.

3. The method of claim 1 in which the drying oil in said dyring oil based paint is linseed oil.

4. A composition comprising a drying oil based paint formulation adopted for exterior use containing, in amounts up to about 10 percent by weight of the drying oil in said paint, the reaction product of ammonia and a mixture comprising from about 20 to about 80 molar percent of dimethyldichlorosilane and the balance of said mixture being vinyltrichlorosilane.

5. A composition comprising a drying oil based paint formulation adopted for exterior use containing, in amounts up to about 10 percent by weight of the drying oil in said paint, the reaction product of ammonia and a mixture of from about 30 to about 40 molar percent of dimethyldichlorosilane and the balance of said mixture being vinyltrichlorosilane.

6. A composition according to claim 4 in which the drying oil in said drying oil based paint is linseed oil.

References Cited by the Examiner
UNITED STATES PATENTS 2,721,873  11/1955  MacKenzie et al.
3,135,713  6/1964  Brewer et al. ____ 260—336 XR ALEXANDER H. BRODMERKEL, *Primary Examiner.*

J. B. EVANS, *Assistant Examiner.*